No. 645,066. Patented Mar. 13, 1900.
R. P. BROWN & F. E. MORSE.
METHOD OF ELECTRIC WELDING.
(Application filed Mar. 16, 1898.)
(No Model.)
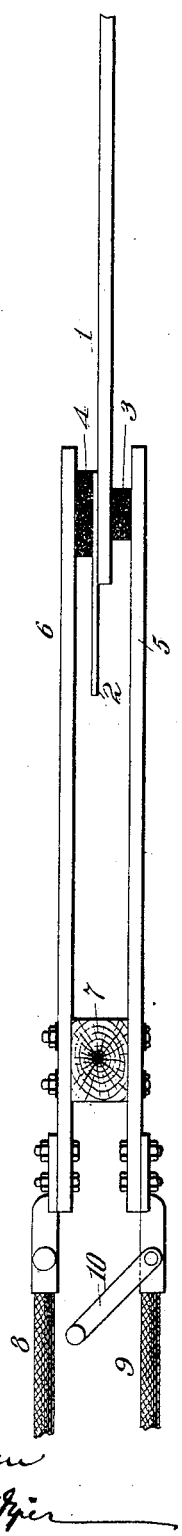
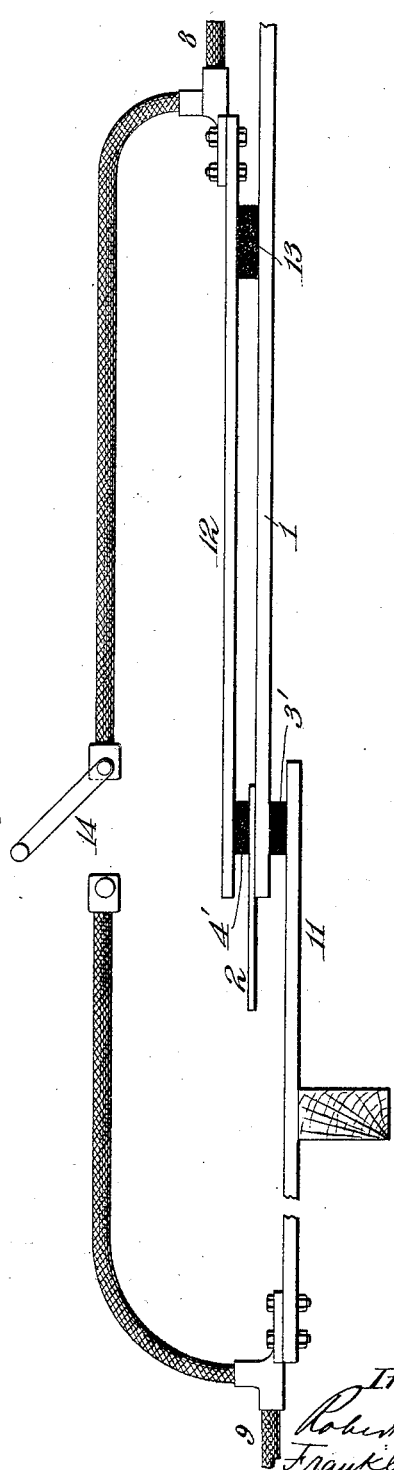
Fig. 1
Fig. 2
Witnesses:
Jas. F. Coleman
Frank L. Dyer
Inventors.
Robert P. Brown
Franklin E. Morse
By Rich'd N. Dyer
Atty.

UNITED STATES PATENT OFFICE.

ROBERT P. BROWN AND FRANKLIN E. MORSE, OF NEW YORK, N. Y.

METHOD OF ELECTRIC WELDING.

SPECIFICATION forming part of Letters Patent No. 645,066, dated March 13, 1900.

Application filed March 16, 1898. Serial No. 674,002. (No specimens.)

*To all whom it may concern:*

Be it known that we, ROBERT P. BROWN and FRANKLIN E. MORSE, citizens of the United States, residing in the city of New York, borough of Brooklyn, county of Kings, and State of New York, have invented certain new and useful Improvements in the Art of Welding or Brazing, of which the following is a specification.

Our invention relates to an improved method of producing welded or brazed joints between metal pieces, and is particularly applicable where the parts to be united are in the form of comparatively-thin plates, strips, &c., which are fastened together flatwise and where the metal of one part has a higher temperature of fusion than the metal of the other part or where the parts being of the same temperature of fusion one part is thinner than the other—that is to say, where the metals to be joined have different characteristics. The difficulty in making such a joint arises from the nature of the union and of the pieces to be united. In many cases it is not practicable to heat the parts separately and afterward unite them; nor will the now-common method of butt-welding by electricity accomplish the end, although metals having different characteristics are readily united in this way. If the parts are placed together in the position in which they are to be united and heat applied to the joint in any of the ordinary ways, a proper union will not be accomplished, inasmuch as the metal having the lower point of fusion will become burned or melted before the other is brought to its required temperature, or where the metals of the parts are the same and one part thinner than the other the thinner piece will reach the welding or brazing point before the larger mass in the other part has attained the requisite temperature and will thereafter become injured, if not destroyed, from excess of heat. Much more difficult still is it to unite the parts when the one having the lower point of fusion is at the same time thinner than the other.

The object of our improvement is therefore to provide a method by which metal pieces having different characteristics may be applied to each other in the desired position and while thus *in situ* have heat applied to them in such manner and degree as to bring the parts to their respective welding or brazing temperature at approximately the same time.

To carry our invention into effect, we make use, preferably, of the electric current, since by its means and the ease of its manipulation we are enabled most readily to apply the required amount of heat to the respective parts at the required difference in degree.

In the accompanying drawings we have shown by way of illustration two ways in which our method may be accomplished by electrical apparatus.

Figure 1 shows diagrammatically an apparatus intended for carrying out our process wherein the proper heating effects are secured by the use of carbons of different size, and Fig. 2 a similar view showing an apparatus intended for the carrying out of our process wherein the proper heating effects are secured by shunting one of the carbons.

In Fig. 1 the numerals 1 and 2 represent edge views of two flat pieces of metal which are to be united by a welded or brazed joint, (and hereinafter we shall only use the terms "welded joint" or "welded," meaning thereby to include as well a brazed joint or brazed.) 1 is the thicker piece or the metal having the higher temperature of fusion, and 2 the thinner piece or the one having the lower temperature of fusion.

3 and 4 are two electrodes, which are held in contact with the pieces 1 and 2 by means of resilient metal arms 5 and 6, bolted to a block 7. The arms 5 and 6 are connected by wires 8 and 9 to a dynamo or converter, and a switch 10 may be used to short-circuit said arms when desired. The two pieces 1 and 2 being held together between the electrodes 3 and 4 by the elasticity of the resilient arms 5 and 6, the current will pass across the two metals at their juncture from electrode to electrode, the novelty of our invention lying in the relative construction of these electrodes and in the manner of manipulating the electric current passing through them.

In the first place, in our preferred method we make the electrodes of refractory conducting material, such as compressed carbon, and of such internal resistance to the current that the electrodes themselves are heated to a high degree, especially at their surfaces which are in contact with the metals. The heat from the electrodes is thus imparted to the metals by conduction from the electrodes where they are in contact, and the resistance of the metals themselves to the current is also utilized in heating the same.

In order to accomplish the object in view, one of the electrodes—namely, that which is in contact with the thicker metal or the metal having the higher temperature of fusion—must be heated to a higher degree than the other, or, in other words, the two electrodes must impart to their adjacent metals such relative amounts of heat that the two pieces shall arrive at their respective welding temperatures at approximately the same time. One way to heat one electrode to a higher degree than the other is to have that electrode present a greater resistance to the current than the other, and this may be accomplished either by making said electrode of less density than the other or of a different material which presents a greater resistance or of a smaller cross-sectional area when the two are of the same material and density.

In the figure referred to we have shown one electrode 3 smaller than the other. Suppose 1 to be a plate of steel and 2 a plate of copper and thinner than 1. It is evident that if heat in equal intensity were applied to both sides of the joint the copper would be melted or burned before the steel could be sufficiently heated; but by means of the difference in the electrodes the heat is so applied to the parts that the steel will be brought up to the required temperature before the copper can be injured, the copper being heated more slowly by the lower temperature imparted to the larger electrode 4. Experience will readily determine the relative construction of the electrodes necessary to do the work under any given conditions as to size, shape, and difference in the metals of the pieces to be united. As soon as the parts are brought to their relative requisite temperatures the current through the electrodes is turned off, as by operating the short-circuiting switch 10, and the joint is allowed to cool or set, after which the electrodes 3 and 4 are removed. It will be found that the resulting joint will be clean and perfect.

In Fig. 2 we have shown a modified form of the apparatus, in which one set of electrodes may be made to do the work under a great variety of different conditions. Here we have shown the electrodes 3' and 4' of the same size, and they may be made of like materials and density. The electrode 3' will be in contact with a heavy bar 11 in the circuit, and the electrode 4' will be engaged by and maintained in contact with the piece 2 to retain the latter in its position upon the heavier piece 1 by a corresponding bar 12, also in the circuit. The bar 12 may, near its rear end, rest upon the block 13, made, preferably, of carbon, so that a part of the current from the electrode 4' will be shunted through said block, whereby the electrode 4' may be maintained at the desired lower temperature. By varying the pressure upon the carbon block 13 the resistance of the shunt will be varied, so that the amount of current tending to heat the electrode 4' may be adjusted within the desired limits. We have described this simple form of regulator merely by way of illustration. Other and more approved ways of accomplishing the same result will readily appear to the skilled electrician. This regulator may also be applied to the form of apparatus shown in Fig. 1. With the apparatus shown in Fig. 2 a short-circuiting switch 14 may be employed to short-circuit the operating-current after the joint has been finished. Instead of effecting a reduction in the temperature of the electrode in contact with the metal having the lower temperature of fusion or the smaller mass by using in contact with such metal an electrode of larger area or of smaller resistance or by shunting a portion of the current from that electrode, as explained, it will be possible to effect the same result by intermittently short-circuiting that electrode, whereby the requisite current may be conducted to the same as to result in the proper heating thereof. With an apparatus such as shown in Fig. 2 this may be accomplished by dispensing with the shunting-block 13 and by intermittently engaging the rear end of the bar 12 with the plate 1 or other work, so that when the said bar is in contact with the plate the electrode 4' will be short-circuited and no current will affect the same. The intermittent short-circuitings of the electrode 4' may be relatively frequent, or, instead, the full current may be allowed to affect the said electrode for a considerable period of time—say for a half-minute or more—until the piece 2 has been raised to a dangerously-high point, after which the said electrode may be short-circuited until the piece 2 is slightly cooled, during which time it will be understood the electrode 3' is being influenced by the entire current and is bringing the larger piece 1 or that having a lower temperature of fusion up to the welding or brazing temperature.

We propose to use a current of low voltage and high amperage, but do not limit ourselves to this. The current may be either direct or alternating. By this means a joint of this nature is very quickly made and presents a neat appearance when completed. The electrodes may be shaped in a variety of ways to accommodate many different conditions in the nature of the work to be done. In fact much work can be readily and quickly done by this method which it is now very difficult, and even in many instances impossible, to accomplish by means hitherto employed. A field in which our method is particularly applicable and in which we have operated the same with success is that of welding flat copper bonding-strips directly to the rails of electric railways.

With the use of the electrodes in the manner above described the heat is localized immediately at the place of juncture, with the required difference in degree upon the sides of the joint which is necessary to bring the steel of the rail and the copper of the bonding-strip to their respective welding temperatures at the same time, and a perfect joint is very quickly and readily made.

While describing our method as preferably carried out by means of electricity in the manner above set forth, we do not limit ourselves to the precise instrumentalities described nor to electricity only as the source of heat. The heat as applied in our method of procedure may be derived from other sources, such as oxyhydrogen or other gas flames, it being necessary to have such control over the heat sources on either side of the joint that the heat derived therefrom shall be concentrated upon the metals at the opposite sides of the joint and the respective heat intensities at the point of concentration varied as the nature of the metals may require.

What we claim as our invention, and desire to secure by Letters Patent, is—

1. The method of welding or brazing together flatwise metal pieces, having different characteristics, which consists in holding the pieces together at the seam or joint, and concentrating heat from two external heat sources upon the metals at opposite sides of the joint, the relative thermal intensities at the point of concentration being so proportioned that the metals of the parts shall be brought to their respective welding or brazing temperatures at approximately the same time.

2. The method of welding or brazing together flatwise metal pieces, having different characteristics, which consists in holding the pieces together at the seam or joint between two electrodes, passing an electric current from one electrode to the other across the joint, the electrodes being so arranged and constructed that the current passing through them is made to impart different degrees of heat to the two electrodes, whereby the metal pieces at the joint are made to attain their respective welding or brazing temperatures by conduction of heat from the electrodes, substantially as described, and of maintaining pressure upon the pieces after the heating-current is turned off and until the joint is sufficiently cooled.

3. The method of welding or brazing together metal pieces having different characteristics, which consists in holding the pieces together at the seam or joint between two electrodes, and passing an electric current from one electrode to the other across the joint, shunting a portion of the current through one of the pieces, around the other piece and one of the electrodes, whereby that electrode receives less heating-current than the other, and of maintaining pressure upon the pieces after the heating-current is turned off, and until the joint is sufficiently cooled.

4. The method of welding or brazing together metal pieces having different characteristics, which consists in holding the pieces together at the seam or joint between two electrodes, passing an electric current from one electrode to the other across the joint, shunting a portion of the current through one of the pieces, around the other piece, and one of the electrodes, whereby that electrode receives less heating-current than the other, providing means for varying and regulating the amount of current passing through the shunting-circuit, and of maintaining pressure upon the pieces after the heating-current is turned off and until the joint is sufficiently cooled.

This specification signed and witnessed this 14th day of March, 1898.

ROBERT P. BROWN.
    FRANKLIN E. MORSE.

Witnesses:
 V. W. WICKES,
 FRANKLIN J. SPAULDING.